April 3, 1928. Re. 16,920

H. J. MURRAY

BURGLARPROOF INDUCTION COIL

Original Filed Oct. 11, 1921

HOWARD J. MURRAY
Inventor

By Smith and Freeman
Attorneys

Reissued Apr. 3, 1928.

Re. 16,920

UNITED STATES PATENT OFFICE.

HOWARD J. MURRAY, OF NEW YORK, N. Y., ASSIGNOR, BY MESNE ASSIGNMENTS, TO H. A. DOUGLAS, OF BRONSON, MICHIGAN.

BURGLARPROOF INDUCTION COIL.

Original No. 1,576,779, dated March 16, 1926, Serial No. 507,011, filed October 11, 1921. Application for reissue filed March 18, 1927. Serial No. 176,529.

The invention relates in general to an induction coil, and specifically relates to a unit constituting an article of manufacture and including an induction coil, a control therefor, and a burglar retarding means which tends to defeat unauthorized tampering with the present condition of the coil. The invention constitutes an improvement in and development of the invention disclosed in my copending application Serial Number 494,278 on automotive theft retardance devices, filed August 22, 1921.

In the illustrated embodiment of the invention constituting the subject matter of the above identified application, there is shown an induction coil with the windings contained entirely within a burglar proof casing provided with a closure at one end and with a circuit closer positioned in the casing between the closed end thereof and the coil. Any casing and closure therefor designed to defeat burglarious attempts to gain access to the interior is expensive, and it is of course a commercial requirement of such devices to economize in cost of construction. However, it is appreciated that any reduction or elimination of the part of the casing in the prior device which encloses the coil would act to decrease its burglar resisting functions, and would even permit the bodily removal of the coil, or at least permit access to the circuit closer, or to the coil terminals leading to the protected circuit closer.

Accordingly, one of the objects of the invention is to retain the advantages inherent in the prior disclosure in that the induction coil and its associated control mechanism can be set by authorized means which will tend to defeat attempts to change the status of the coil when so set, and, at the same time, by the improved device herein disclosed, to attain these results with the use of a smaller amount of burglar resisting material than is necessary with the prior device.

Incidental to this desideratum, the invention contemplates the inclusion of a burglar proof means for securing the coil to the burglar proof casing in such a way that access to the securing means is provided only through the casing, and any attempt to gain access to the fastening means through the coil will destroy the same.

In other words it is the intent of the present disclosure to retain the advantages inherent in a coil which is exposed in the sense of not being contained within a magnetic circuit forming enclosure, but which, at the same time, is so associated with its burglar resisting features as will cause the coil to become functionally inoperative, and even mutilated, by any surreptitious attempt to gain access to the control mechanism, or to remove the coil from the burglar resisting parts of the complete unit.

In one form of the invention herein selected for illustration it is assumed that the device constitutes part of the ignition system in an automotive power plant, and when so used it is intended that the control mechanism be key-controlled in order to set the coil in an inoperative position to prevent actuation of the power plant. When so used the device will resist unauthorized attempts to cause the ignition circuit to function by closing the open circuit across the secondary winding terminals, to restore the operativeness of the coil.

Accordingly, another object of the invention, when considered in this specific application of one way of using the invention, is to provide a simple inexpensive coil which can be sold as an automotive accessory to take the place of the present coil, and which will include a protector for preventing the use of the coil in a circuit which is set so as to be inactive. The invention features small size means for protecting the controlling switch of the circuit closer, for preventing the intact demounting of the coil when locked in place, for retarding attempts to restore the coil back into operative condition, and in general to prevent or at least retard unauthorized attempts to change the status of the coil or the circuit which contains the coil.

Various other objects and advantages of the invention will be in part obvious from an inspection of the accompanying drawings, and in part will be more fully set forth in the following particular description of one form of mechanism embodying my invention, and the invention also consists in certain new and novel features of construction and combination of parts hereinafter set forth and claimed.

In the accompanying drawings:

Figure 2 is a transverse sectional view taken on the line 2—2 of Figure 1 looking in the direction indicated by the arrows; while

Figure 1:
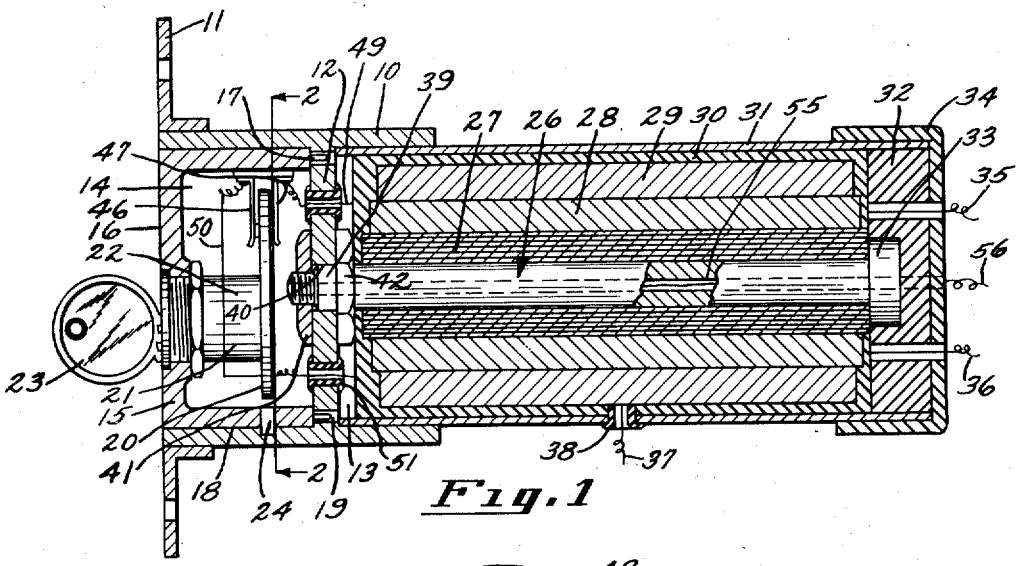
Figure 1 is a vertical sectional view taken axially through a preferred embodiment of the invention.
Figure 2:
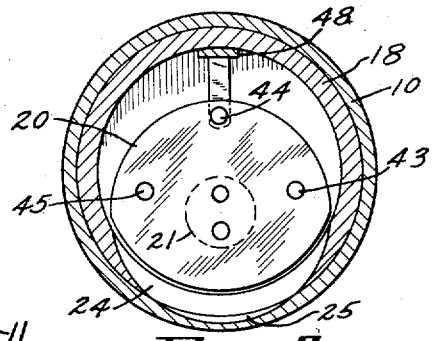

In Figures 1 and 2 there is shown a casing 10 secured fixedly in position in a mounting plate 11 which may be the instrument board of the vehicle or any other support. The casing 10 is of cylindrical form, is open at opposite ends, and is provided centrally with an integral barrier 12 which divides the casing 10 into a rear coil-containing chamber 13 and a front mechanism containing chamber 14. The casing 10, including the barrier 12, is of steel, has a case-hardened outer surface, and has a relatively soft inner surface. The casing 10 is thus designed to resist filing, drilling, chiselling or shattering, as is more fully described in the above identified application.

The front end of the casing 10 is closed by means of a cylindrical locking cap 15, the outer wall 16 of which is case-hardened, as previously described for the casing 10 so as to retard if not defeat unauthorized entrance into the chamber 14 through the front side of the device. Relative rotary movement between the cap 15 and the casing 10 is prevented, and the locking elements located, by means of locating pins 17 which extend from the free edge of the cylindrical flange 18 of the cap 15 into suitably disposed recesses 19 formed in the barrier 12 adjacent its perimeter. The cap 15 is locked to the casing 10 by means of a locking cam 20 fixed to the rear end of the barrel 21 of a lock 22 which is fitted into and secured to the wall 16. The locking cam 20, and part carried thereby, are controlled by means of a key 23 actuated from the exterior of the device as is usual in such structures.

The cam 20 is of an eccentric type, and is designed to be rotated by the key 23 into a locking position, and in this position extends through a slot 24 in the flange 18 of the cap 15, and is fitted into an arcuate recess 25 formed on the inner side of the casing 10.

An induction coil 26 of the usual cylindrical form has one end thereof fitted within the chamber 13, and has its major portion projecting exteriorly of the flange which forms the portion of the casing 10 to the rear of the barrier 12. It is a feature of this disclosure that the coil 26 is largely exposed, that is, as much of the coil as is possible is disposed to the outside of the metallic casing. In this way the electrical efficiency of the coil will be affected by the metallic casing as little as possible.

Except for the core bolt 26′ the coil is substantially of conventional form and includes a bundle of core wires 27 encircled by primary windings 28 which in turn are encircled by secondary windings 29. The structure is enclosed within an insulating filler shell 30 which in turn is encircled by an outer fibrous covering shell 31. The outer end of the shell 31 encircles an end filler 32 at the exposed end of the core 26′. The filler 32 is of some material thickness and encloses the head 33 of the core bolt 26′. An end cap 34 finishes off the outer end of the coil 26.

Primary leads 35 and 36 extend through the exposed end of the coil 26 and lead respectively to and from the primary winding 28. It is understood that the leads 35 and 36 are part of the circuit which includes the primary winding 28 of the coil 26, a source of electric energy, and other instruments usual in such circuits. A secondary lead 37 from the secondary winding 29 extends through an insulating bushing 38 in the side of the coil 26, and is intended to lead to the spark plug or other usual instruments in the secondary circuit, as is usual in well known coil constructions.

A distinctive feature of the core bolt 26′ is that it is made of carbonized steel, or similar burglar resisting material, which will tend to resist drilling, cutting, twisting, or other distorting action, by persons attempting to demount the coil 26 from the burglar proof casing 10. The core bolt 26′ projects from the end of the coil 26 within the chamber 13, and has a squared shank 39 fitted within a squared opening 40 extending centrally through the barrier 12. The extreme end of the core bolt 26′ is externally threaded, and has a nut 41 in engagement therewith. This nut 41 acts as a locking means for securing the core bolt 26′ in position when the nut 41 is in bearing engagement with the side of the barrier 12. A nut 42 engages the opposite side of the barrier 12, and is disposed between the barrier 12 and the coil 26, and in this way constitutes a shoulder for limiting the movement of the bolt 26′ towards the barrier 12. Tightening up on the nut 41 secures the bolt 26′ fixedly in position, and the square fit of the bolt 26′ in the barrier 12 prevents turning of the bolt 26′ about its axis. It is a feature of this disclosure that access to the bolt locking means can be attained only from the open end of the casing 10, and in this way the locking means provided by the nut 41 is protected by the burglar proof casing 10 when the locking cam 20 is in its locked position.

Figure 3:
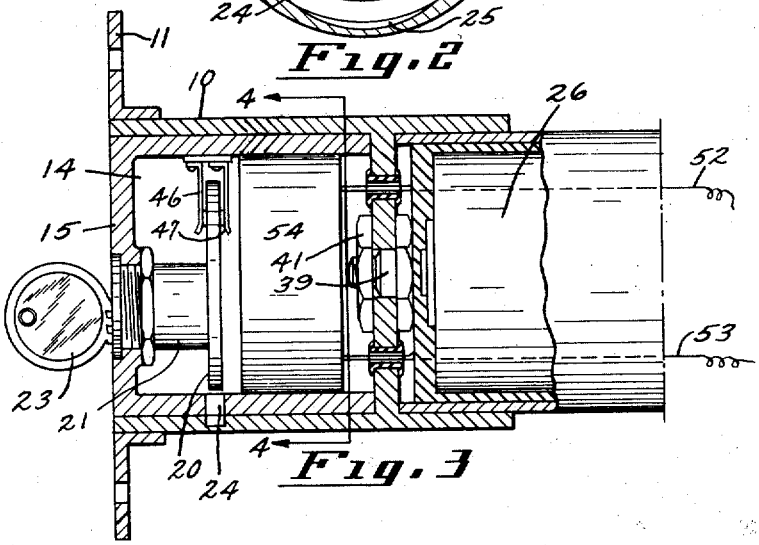
Figure 3 is a fragmentary view similar to the showing at the left hand side of Figure 1 and slightly modified to accommodate mechanism in the casing in addition to the mechanism shown in Figure 1.

A circuit closer 42, for controlling the coil 26 is positioned within the protected compartment 14, and is preferably controlled by the rotation of the locking cam 20 so that the one key can be used both to lock the closure 15 and control the coil 26. The cam 20 is provided with one or more contact buttons, herein shown to be three, 43, 44, and 45, fitted to extend through the locking cam 20. Opposite ends of each button are adapted when rotated into proper position to be engaged by spring contacts 46 and 47 carried by and insulated from each other by a bracket 48. The contacts are connected respectively to leads 49 and 50 extending through bushings 51 in the barrier 12. These leads constitute part of the electric circuit which includes the primary winding 28 and the source of energy. Where more than one of the contact buttons is carried by the cam 20 it is intended that the cam 20 control other circuits than the primary winding circuit thus described. For this purpose there is shown in Figure 3 additional conductors 52 and 53 which extend straight through the body of the coil from end to end, and through the bushings 51 in the barrier 12. These extra conductors 52 and 53 may be connected to the circuit closer illustrated in Figure 1, and may be operatively connected to other circuit affecting instrumentalities. For instance, the conductors 52 and 53 might be included in a signal or head light circuit which could be controlled by the manipulation of the key 23 in any desired preset relation to the closing or opening of the circuit through the primary winding 28.

Similarly it is to be understood that the closing or opening of the circuit including the primary winding 28 may be controlled by other instrumentalities than the manually actuated locking cam 20 featured in Figure 1, and to show one such form of structure, there is shown in Figure 3 a slightly larger chamber 14 than the chamber illustrated in Figure 1. In Figure 3 the chamber 14 contains a unit or casing 54 which may be considered as containing a pendulum controlled circuit closer of the type disclosed in my copending application Serial Number 436,803, entitled Multiplex burglar alarm, filed January 12, 1921.

Instead of leading the wires 52 and 53 through the body of the coil 26, the bolt 26′ may be tubular and contain a bore 55 through which extends a cable 56 containing the wires 52 and 53, and, if desired, one or both of the primary circuit leads 35 and 36, or even the secondary lead 37 may also extend through the bolt 26′ directly into the chamber 14.

In operation it is to be understood that the coil functions as is usual in such devices, and that by the simple manipulation of the key 23 the cap 15 may be locked in position, and the circuit closer, and other instruments controlled by the key, locked in either an opened or closed circuit position. Assuming that the coil 26 forms part of an ignition circuit, then when the operator desires to leave the car he will turn the locking cam 20 into such position as will lock the closure 15 to the casing, and lock the circuit in opened position.

When so set it is apparent that access to the circuit closer, or the leads connected thereto, is retarded, if not prevented, by the burglar proof casing 10. This leaves access to the leads only through the coil 26, but it is obvious that any attempt to gain access to the leads 49 and 50 through the coil 26 would destroy the operativeness of the coil 26. When so destroyed, or even mutilated, it could not be used, even if the burglar should succeed in closing the primary circuit by electrically connecting the wires 49 and 50. As the coil 26 is secured to the casing 10 by means of the bolt 26′ it is seen that any attempt to gain access to this bolt 26′, which is in the interior of the coil 26, would likewise result in the mutilation of the coil 26, and its effectiveness would thus be destroyed. It will therefore be understood that when this device is used as a part of the ignition system, rotation of the cam into the proper position will cause the construction herein disclosed to resist any effort to restore the coil to operative condition.

Those skilled in the art will readily understand that the various embodiments of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. In an induction coil unit, the combination of cylindrical metallic burglar proof casing open at opposite ends and provided with a barrier for dividing the casing into a circuit closer containing compartment and into a coil receiving compartment, an induction coil having one end fitted in said coil receiving compartment and projecting therefrom, said coil including a core bolt with one end secured to said barrier, means accessible through the open end of the circuit closer containing compartment for locking the bolt in place, said barrier provided with an opening extending therethrough, a circuit closer disposed within the circuit closer containing compartment for controlling the coil, a conductor leading from the primary windings of the coil through said opening to the circuit closer and a burglar proof closure for the open end of the circuit closer containing compartment.

2. In an induction coil unit, the combination of a metallic casing open at opposite ends and having a barrier integral therewith and dividing the casing into a circuit closer containing compartment and into a coil receiving compartment, an induction coil with one end fitted in said second named compartment and with the major portion of the coil projecting from the casing, a circuit closer in said first named compartment operatively connected to the coil through said metal barrier, a closure for the first named compartment and metallic fastening means for securing the coil in locked position to the metal barrier.

3. In an induction coil unit, the combination of a metallic casing open at opposite ends and having a barrier integral therewith and dividing the casing into a circuit closer containing compartment and into a coil receiving compartment, an induction coil with one end fitted in said second named compartment and with the major portion of the coil projecting from the casing, a circuit closer in said first named compartment operatively connected to the coil through said metal barrier and a closure for the first named compartment.

4. An induction coil unit including a metallic end wall, a core bolt secured to said wall, extending therefrom in one direction and coacting therewith to form part of the magnetic circuit of the coil, a circuit closer on the side of the wall opposite the extending bolt and operatively connected through the wall to control the circuit through the primary windings of the coil and burglar proof means enclosing the circuit closer for securing the same against unauthorized attempts to change the status of the coil as set by the circuit closer.

5. An induction coil provided with a mounting end, a burglar proof casing for receiving said end permitting the remainder of the coil to project from the casing, a core bolt positioned in the coil and projecting beyond the outlines of the mounting end and into said casing, the projecting portion of the bolt provided with means for securing the coil to the casing and a conductor leading from one of the coil windings through said mounting end adjacent the projecting portion of the bolt.

6. An induction coil unit including an end wall, with the coil windings on one side thereof, a core bolt extending through the windings and end wall, locking means on the side of the wall opposite the coil windings for securing the bolt to the wall and a burglar proof casing enclosing the locking means and acting to retard unauthorized access to the locking means.

7. In a device of the class described, the combination of a burglar retarding casing, circuit affecting means contained therein, an induction coil secured to the casing and operatively connected to the circuit affecting means, means constituting an interior portion of the coil for securing the same to the casing, the outer portion of the coil constituting a barrier surrounding the operative parts of the coil and acting to retard unauthorized attempts to gain access to said securing means through the coil and said coil and its securing means being protected by the casing at one end whereby the coil cannot be removed intact from the casing.

8. In an induction coil unit, the combination of an induction coil, a theft retarding safe, means solely accessible from the interior of the safe for securing the coil to the safe, said means constituting the internal core of the coil whereby unauthorized detachment of coil from the safe by mutilation of the coil will cause it to become inoperative.

9. In an induction coil unit, the combination of an induction coil, a theft retarding safe enclosing one end of the coil and permitting the other end to be exposed, means solely accessible from the interior of the safe for securing the coil to the safe, said means constituting a necessary structural part of the interior of the coil whereby unauthorized detachment of coil from the safe by mutilation of the exposed portion of the coil will cause it to become inoperative.

10. An induction coil having its magnetic circuit partially of metal and partially extending in air, said coil including a straight metallic core constituting a part of the magnetic circuit and a casing, means in the casing for controlling the coil, said casing including a mounting means for receiving one end of the coil and said means being metallic and constituting a portion of the magnetic circuit continuous with one end of the core.

11. An induction coil having end walls, a centrally positioned core bolt having one end contained in one of said end walls and the other end projecting through the other end wall, conductors leading through both of the end walls, certain of said conductors being included in the circuit containing the primary windings of the coil, a circuit affecting instrumentality operatively connected to certain other of said conductors and certain others of said conductors being independent of the primary windings.

12. An induction coil having primary windings and a core constituting a means for mounting the coil in place and positioned centrally in the core winding, two pairs of conductors, each pair leading to the primary windings, circuit affecting means operatively connected to one pair of the conductors and the other pair of the conductors constituting part of the circuit including the primary windings and said circuit affecting means.

13. An induction coil including a metallic core provided with a bore and a flexible conductor positioned in said bore.

14. In a power plant for an automotive vehicle, a unit comprising: an element essential for the operation of said power plant; control means settable into condition at least restricting the functioning of said element; lock means for preventing unauthorized actuation of said control means from said condition; a theft-resisting casing enclosing said control means and at least the adjacent portion of said element and for preventing unauthorized access to said control means without disassembly of said unit; and securing means for said element held against unauthorized removal and for preventing unauthorized disassembly of said unit without destruction of at least an essential part of said element.

15. In an ignition system of an internal combustion engine of an automotive vehicle, a unit comprising: the ignition coil of said system; control means settable into condition at least restricting the functioning of said coil; lock means for preventing unauthorized actuation of said control means from said condition; a theft-resisting casing enclosing said control means and at least the adjacent portion of said coil and for preventing unauthorized access to said control means without disassembly of said unit; and securing means for said coil held against unauthorized removal and for preventing unauthorized disassembly of said unit without destruction of at least an essential part of said coil.

16. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; lock means for preventing unauthorized actuation of said control means from said condition; and securing means for said element held against unauthorized removal cooperating with said casing and said element to secure said element in position cooperating with said casing and said securing means to block access to said control compartment through said element compartment and held against unauthorized removal from such position without destruction of at least an essential portion of said element.

17. In an ignition system of an internal combustion engine of an automotive vehicle, a unit comprising: a theft-resisting casing provided with a coil compartment, and with a control compartment closed against unauthorized access except through said coil compartment; the ignition coil of said system, disposed at least partly within said coil compartment; control means within said control compartment settable into condition at least restricting the functioning of said coil; lock means for preventing unauthorized actuation of said control means from said condition; and securing means for said coil held against unauthorized removal cooperating with said casing and said coil to secure said coil in position cooperating with said casing and said securing means to block access to said control compartment through said coil compartment and held against unauthorized removal from such position without destruction of at least an essential portion of said coil.

In witness whereof, I hereunto affix my signature.

HOWARD J. MURRAY.